R. HARA.
BREAD SLICING MACHINE.
APPLICATION FILED JAN. 3, 1918.

1,323,591.

Patented Dec. 2, 1919.
3 SHEETS—SHEET 1.

Inventor
Rikwo Hara.

By Lancaster *his Attorneys*

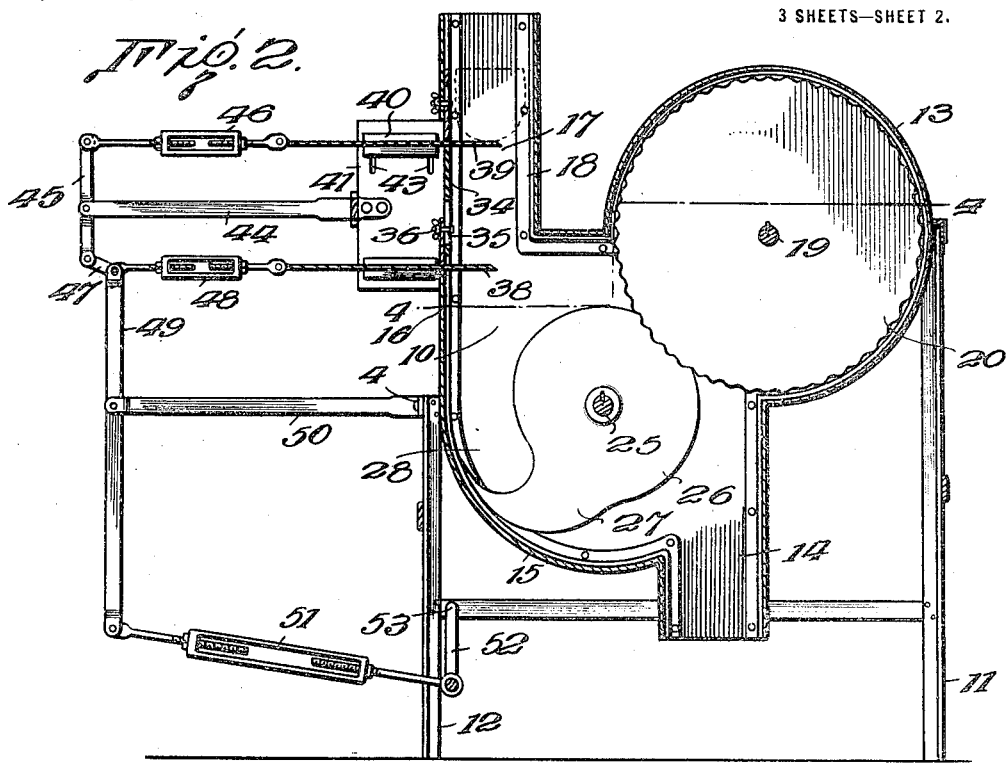
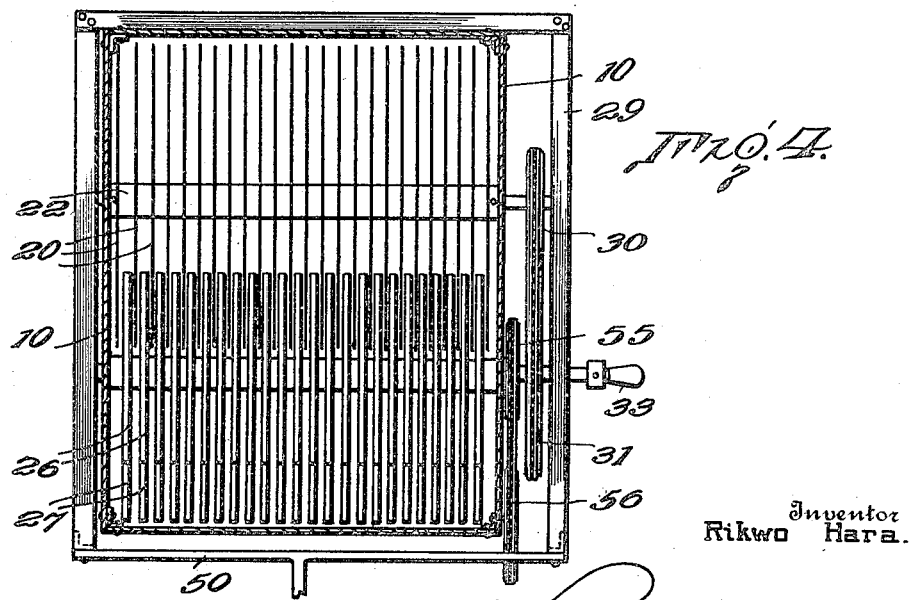

R. HARA.
BREAD SLICING MACHINE.
APPLICATION FILED JAN. 3, 1918.
1,323,591.
Patented Dec. 2, 1919.
3 SHEETS—SHEET 3.
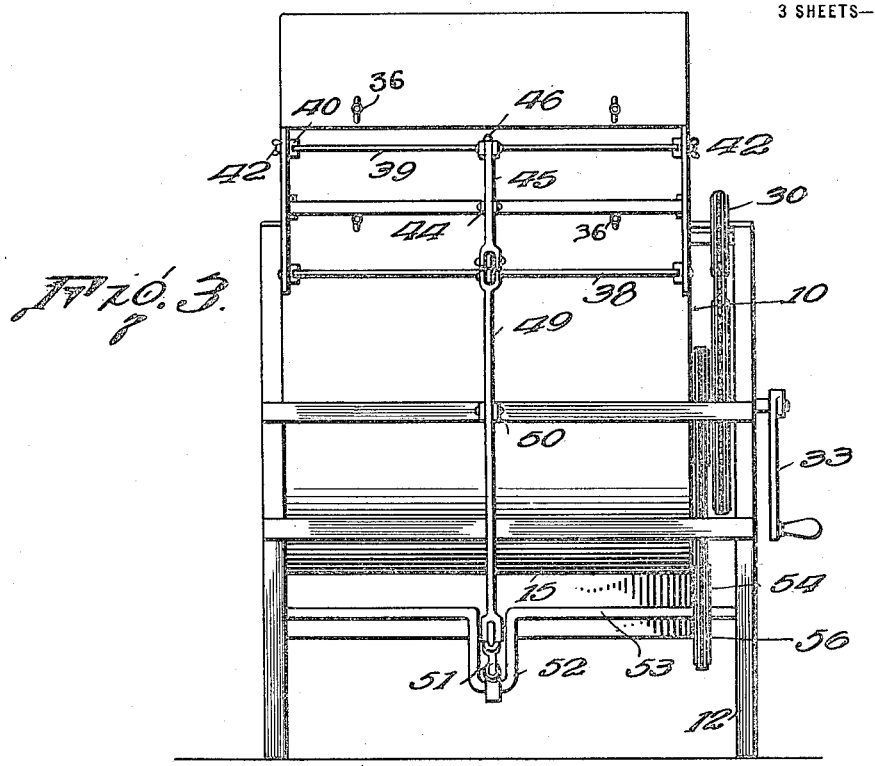
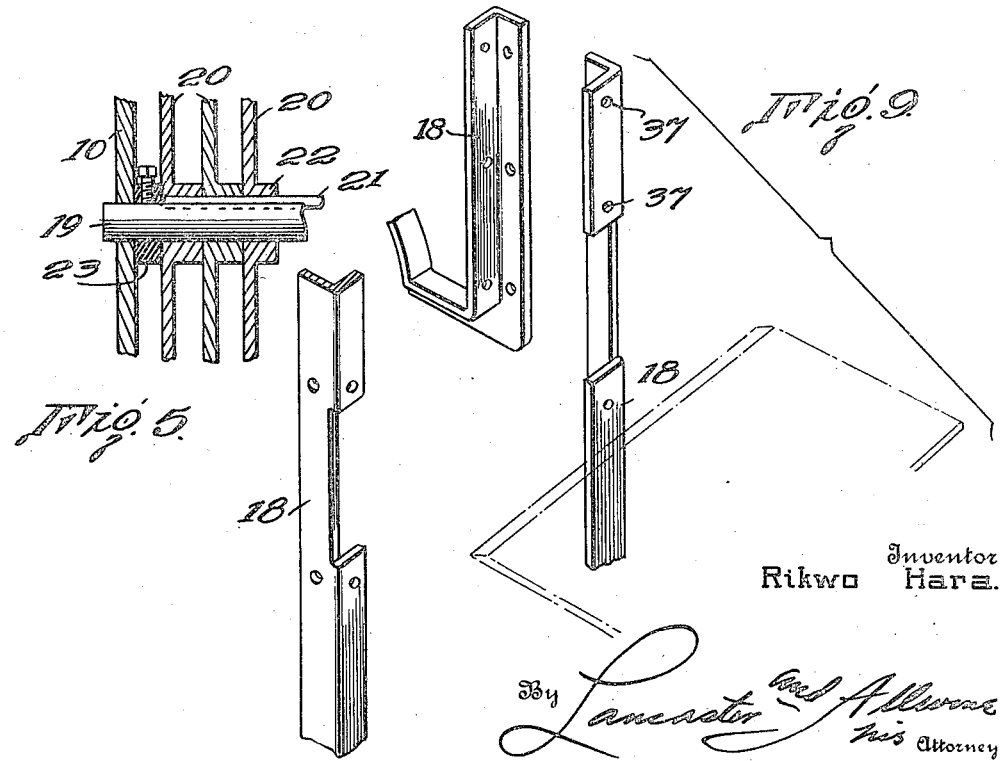
Inventor
Rikwo Hara.

UNITED STATES PATENT OFFICE.

RIKWO HARA, OF HONOLULU, TERRITORY OF HAWAII.

BREAD-SLICING MACHINE.

1,323,591.      Specification of Letters Patent.      Patented Dec. 2, 1919.

Application filed January 3, 1918. Serial No. 210,168.

*To all whom it may concern:*

Be it known that I, RIKWO HARA, a citizen of the United States, residing at Honolulu, Territory of Hawaii, have invented certain new and useful Improvements in Bread-Slicing Machines, of which the following is a specification.

This invention relates to an improved cutter or slicer adapted particularly for use in slicing bread.

The object of the invention is to provide a device adapted to simultaneously cut an entire loaf of bread throughout its length into slices of the desired width; to provide a machine which may be operated by hand or light power; to provide an automatic feeding device adapted to deliver loaves of bread one at a time to the cutters and to consecutively admit loaves to the feeder; and to provide a construction of bread cutter which is easy to adjust for the reception of loaves of various sizes, and which comprises relatively few parts which may be economically manufactured.

The invention embodies various other important features which will be hereinafter in part described, and in part understood, from the following detailed description of the present preferred embodiment, the same being illustrated in the accompanying drawings, wherein:

Fig. 2 is a longitudinal vertical section through the same.

Fig. 3 is an end elevation of the machine, showing the feeding mechanism.

Fig. 4 is a horizontal section taken through the machine substantially on the line 4—4 of Fig. 2, showing the loaf carrier and the cutting knives in their relative positions.

Fig. 5 is a fragmentary sectional view through the cutter, showing the mounting of one end of the cutter shaft in the casing and the mounting of the adjacent disks or cutting elements on the shafts.

Fig. 9 is a fragmentary perspective view of the casing frame adjacent the throat.

Figure 1:
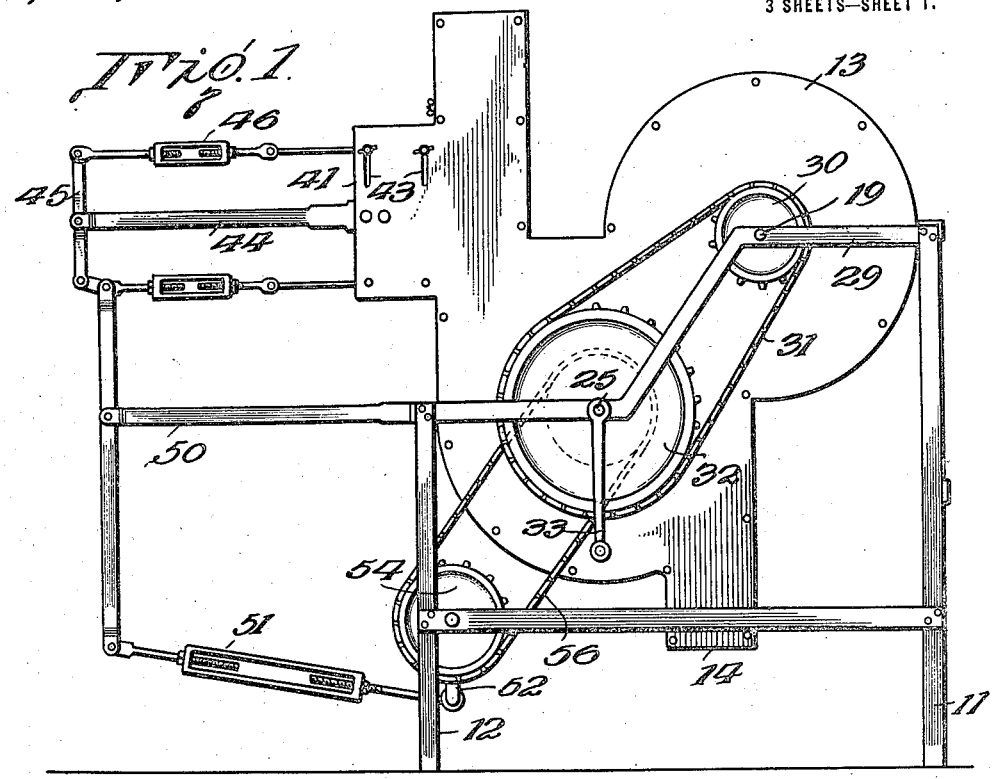
Figure 1 is a side elevation of a bread slicing machine constructed according to the present invention.
Figures 6, 7, 8:
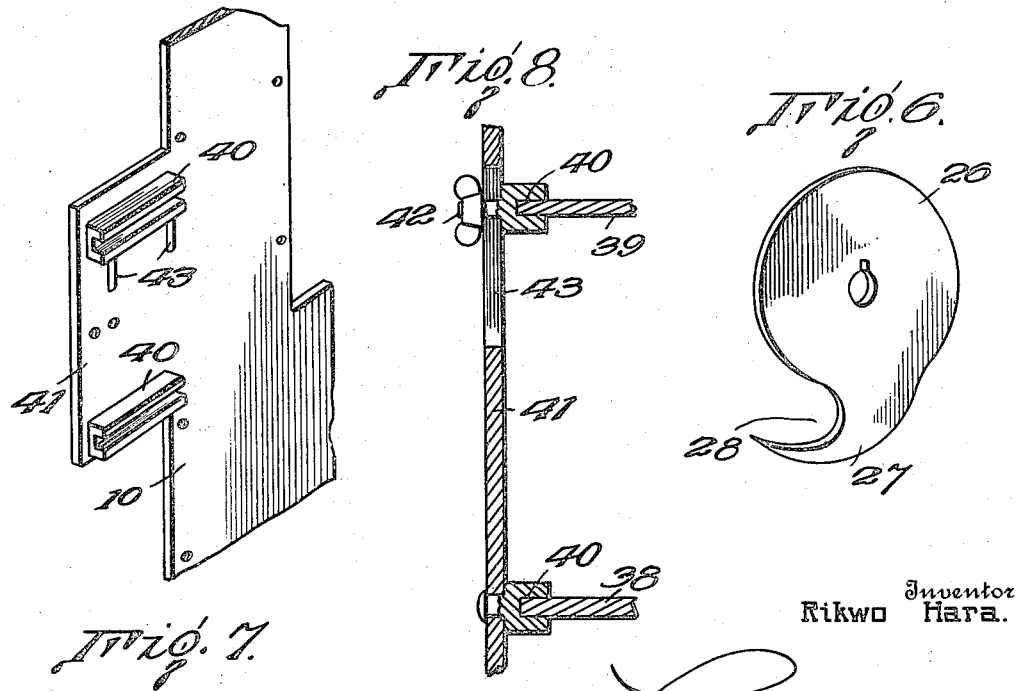
Fig. 6 is a detail perspective view of one of the loaf carrier elements.
Fig. 7 is a fragmentary perspective view of one side of the casing at the throat, showing the adjustable guides for the controlling gates.
Fig. 8 is a fragmentary section, enlarged, through the same.

Referring to these drawings 10 designates the body part of a casing which may be constructed of sheet metal shaped to the desired configuration and supported upon legs 11 and 12 of angle iron construction. The casing is shaped to form an inclosing cylinder 13 at its forward end and at its top, the cylinder 13 having its lower wall merged into a depending delivery chute 14 opening through the bottom of the frame.

The rear end of the casing has a curved bottom wall 15 of substantially semi-cylindrical contour merging into the delivery throat 14 at one side and to an upstanding rear wall 16 at its opposite side. The rear wall 16 projects upward to the desired height and forms a closure for the rear side of an entrance chute or throat 17. The frame thus formed is preferably reinforced and connected at its meeting edges by angle irons 18 bent and curved to follow the lines of the casing.

Within the cylinder 13 of the casing is arranged, axially, a cutter shaft 19 projecting at opposite ends through the sides of the casing 10 and provided with a plurality of closely spaced apart elements 20 in the form of disks having preferably corrugated cutting edges. As shown to advantage in Fig. 5, the shaft 19 has a longitudinal key 21 which fits into key slots formed in hubs 22 carried by the cutters 20. The cutters thus turn with the shaft 19. The hubs 22 serve as spacers for the disks 20 to hold the same apart at the desired distance. The shaft 19 carries a collar 23 on one end arranged to lie between the adjacent side of the casing 10 and the flat side of the adjacent disk 20. A set screw 24 holds the collar 23 to the shaft.

Positioned axially within the lower cylinder 15 is a bread carrier, the same comprising a transverse shaft 25 carrying a plurality of disks 26 having radially extending arms 27 provided with undercut recesses 28 opening peripherally at one edge of the arm 27 to form a socket of a size to receive, loosely, a loaf of bread therein. The disks 26 correspond in number substantially to the number of cutters 20 employed. The disks 26 are keyed upon the shaft 25 with their arms 27 in transverse register and the sockets 28 open upwardly toward the throat 17 as the arm 27 registers beneath the throat, For supporting the transverse cutter and carrier shafts 19 and 25, side brackets 29 are secured in spaced relation across the opposite sides of the casing 10, the brackets 29 being shaped to register with and support the opposite ends of the shafts and being secured to the upper ends of the legs 11 and 12. Between one of the brackets 29 and the adjacent sides of the casing 10, the shaft 19 is provided with a sprocket wheel 30 over which is trained a chain 31.

The shaft 25 is provided with a relatively large sprocket wheel 32 over which the chain 31 passes and which is in register with the smaller sprocket wheel 30. The shaft 25 is provided with a crank handle 33, or suitable means for rotating the shaft.

The rear wall 16 terminates a short distance above the cylinder 15 and carries an adjustable rear wall section 34 in the form of a plate having vertical slots 35 for the reception of bolts 36 therethrough and provided with winged nuts. The bolts 36 pass through apertures 37 formed in the inturned flanges of the rear angle irons 18 of the frame. The back plate 34 is provided with horizontal slots in suitably spaced apart relation through which project sliding gates 38 and 39. The gates are preferably in the form of flat boards or sheets of metal and are engaged at opposite edges by horizontal channel blocks 40 forming guides. The blocks 40 are vertically adjustable against the inner faces of a pair of wings 41 which project inwardly beyond the wall plate 34 and form continuations of the sides of the casing 10. The guides 40 are held to the wings by bolts 42 having winged nuts to admit manual adjustment of the guides. The bolts 42 at the upper ends of the wings are adapted to slide vertically in slots 43 in the wings to adjust the distance between the gates 38 and 39.

A bracket arm 44 projects rearwardly from the wings and pivotally supports the intermediate portion of a rocking lever 45. The upper end of the lever 45 is connected by a turn buckle 46 to the upper gate 39, being pivoted to the latter to admit free movement of the parts. The lower end of the lever 45 is connected by a link 47 to the rear end of a turn buckle 48 which is pivotally connected to the lower gate 38. The link 47 is also connected to the pivot of the turn buckle 48 and to the upper end of a rocking arm 49 which is pivoted intermediate its ends upon a second bracket 50 which projects rearwardly from the frame of the casing 10. A connecting rod 51, preferably in the form of a turn buckle to admit longitudinal adjustment, and which is hinged to the crank 52 of a shaft 53 journaled transversely in the lower rear portion of the frame. The shaft 53 has a sprocket wheel 54 thereon in register with a sprocket wheel 55 fixed to the feeder shaft 25 and connected thereto by an endless chain 56. The sprocket wheels of the machine are proportioned to effect the required timing of operation of the various parts.

In operation, loaves of bread are fed into the throat 17 and the back plate 34 and the top guide 40 are adjusted with respect to the lower gate 38 a distance equal substantially to the height of the loaves of bread. The stack of loaves is supported upon the upper gate 39, and the shaft 25 is rotated.

When the shaft is turned the feeder is rotated to raise the pocket 28 into line with the throat 17, and the gate operating means above described is proportioned to shift the gates 38 and 39 to project the lower gate 38 into the throat 17 and retract the upper gate 39. The lowermost loaf of bread now falls on the gate 38, and as the feeder is further rotated and the socket 28 is advanced upward toward the throat 17, the valves or gates are again shifted, the upper gate 39 retaining the stack of loaves in the throat and the lower gate 38 freeing the loaf supported thereon. The freed loaf falls into the pocket 28 and is carried by the feeder into contact with the cutter. The cutter elements 20 simultaneously engage the loaf throughout its length and the overhanging portions of the arms 27 force the loaf into the cutter, simultaneously slicing the loaf throughout its length. The sliced loaf is further carried by the feeder out of the cutter and is permitted to drop out of the pocket 28 into the delivery chute 14. A tray or the like may be placed beneath the chute 14 to receive the slices of bread.

The various turn buckles are so located as to admit of minute adjustment of the valve operating means to release the loaves one at a time through the throat, and the disks 20 are held in uniformly spaced relation by their hubs 22 which may be of the desired length for cutting slices of the desired thickness.

It is of course understood that various changes and modifications may be made in the details of construction and design of the above specifically described embodiment of this invention without departing from the spirit thereof, such changes and modifications being restricted only by the scope of the following claims.

What is claimed is:

1. In a bread slicing machine, the combination of a casing having an entrance throat, a delivery chute on said casing, a cutter in the casing comprising spaced apart disks, a rotary feeder in the casing having a transverse pocket adapted to receive a loaf of bread and interfitting with the disks of the cutter, the slices of bread cut by said cutter remaining in said pocket and being delivered therefrom into the delivery chute.

2. In a bread slicing machine, a casing, a cutter in said casing, comprising spaced apart cutting disks, a rotary feeder in the casing having a transverse pocket, adapted to receive a loaf of bread and interfitting with the disks of the cutter, an entrance throat on said casing upon one side of the axis of the rotary feeder and adapted to feed loaves of bread into said pocket, a delivery chute on said casing and disposed upon the opposite side of the axis of the feeder from the entrance throat, whereby the slices of bread cut by said cutter will remain in said pockets for a portion of the rotation of the feeder and be delivered therefrom into said delivery chute.

3. In a bread slicing machine, the combination of a casing having an entrance throat, a cutter within said casing, a feeder within said casing, operating means for the cutter and feeder, a pair of vertically spaced gates, slidable horizontally through said throat, means adjustably supporting one of said gates to permit adjustment thereof to regulate the space between the gates in accordance with the size of the bread to be sliced, and a connection between said operating means and said gate for actuating said gates to alternately receive and discharge a loaf of bread into and from the space between the gates.

4. In a bread slicing machine, the combination of a casing, having an entrance throat, vertically spaced apart gates slidable through the side of the throat, a rocking lever carried by the casing having connection at opposite ends to said gates, a rocking arm hinged at one end to the rocking lever, a rotary feeder in the casing beneath the throat adapted to receive loaves of bread delivered by the gates, a cutter, operating means for turning the cutter and the feeder, and a connection between said operating means and the other end of said rocking arm for actuating said gates to alternately receive and discharge a loaf of bread into and from the space between the gates.

5. In a bread slicing machine, the combination of a casing having a receiving throat, a feeder in the casing beneath the throat, a cutter in the casing adjacent the feeder, operating means for turning the feeder and the cutter, a crank shaft on the casing having connection with the operating means to be turned thereby, spaced apart gates slidable transversely in the throat, a rocking lever pivotally supported upon the casing, independently adjustable connections between the gates and the opposite ends of said lever, a rocking arm pivoted upon the casing and having one end connected to one end of said lever, and an adjustable connection between the other end of said arm and said crank shaft.

RIKWO HARA.